3,108,107
PRODUCTION OF METHYL ETHERS OF COMPOUNDS OF THE YOHIMBANE SERIES
Alfred Popelak, Mannheim, and Gustav Lettenbauer, Lampertheim, Hesse, Germany, assignors to C. F. Boehringer & Soehne G.m.b.H., Mannheim-Waldhof, Germany, a corporation of Germany
No Drawing. Filed Mar. 27, 1962, Ser. No. 182,951
Claims priority, application Germany Mar. 28, 1961
6 Claims. (Cl. 260—287)

The present invention relates to new and valuable methyl ethers of compounds of the yohimbane series and to an improved process of making such and other ethers.

Methylation of hydroxyl groups in compounds which also contain one or several amino groups can be effected in a technically satisfactory manner only by reaction with diazomethane. For methylating the hydroxyl group in aliphatic or cycloaliphatic compounds which do not contain in neighboring position to the hydroxyl group a polar group or a group when can be converted into such a polar group, as this is the case with compounds of the yohimbane series, it is necessary to carry out the reaction with diazomethane in the presence of a catalyst capable of forming a complex compound. The type of solvent used is also of considerable importance in this reaction.

Methylation of the yohimbane compound reserpic acid methyl ester by a treatment with diazomethane in the presence of fluoroboric acid as catalyst has been described, for instance, in "Chem. Eng. News," vol 39, No. 6, page 50 (1961); see also "Experientia," vol. 17, page 14 (1959). When carrying out methylation according to said publications, the yield is very low. Therefore, attempts have been made to prepare the methyl ether of reserpic acid methyl ester by methanolysis of the 18-p-bromobenzene sulfonate of reserpic acid methyl ester. However, only the 18-epi-compound could be obtained thereby.

This negative result is not at all surprising taking into consideration the presence of a tertiary nitrogen atom in the molecule of reserpic acid. It could be expected that such a tertiary nitrogen atom would preferably react with such complex forming agents. According to the above mentioned publication fluoboric acid must in fact be added in an excess in order to achieve any methylation at all.

It is one object of the present invention to provide a simple and effective process of methylating reserpic acid methyl ester by means of diazomethane with a good yield.

Another object of the present invention is to provide a simple and effective process of producing the methyl ethers of compounds having a yohimbane ring system, such as deserpidic acid esters, yohimbine, seredine, and others, regardless whether compounds of the allo-, epi- or, respectively pseudo series are involved.

A further object of the present invention is to provide new and valuable methyl ethers of yohimbine and α-yohimbine.

Still another object of the present invention is to provide new and valuable, therapeutically useful compositions for the treatment of peripheral circulary disturbances.

Other objects of the present invention and advantageous features thereof will become apparent as the description proceeds.

In principle, the process according to the present invention consists in methylating reserpic acid esters and other compounds of the yohimbane series by means of diazomethane in the presence of aluminum alcoholates as catalysts. The reaction proceeds smoothly and the yield is surprisingly high.

It is not necessary to use aluminum alcoholate in amounts equivalent to the hydroxyl groups to be methylated in the respective yohimbane compound. On the contrary, it has been found that less than one mole of aluminum alcoholate calculated for one hydroxyl group to be methylated produces satisfactory results. This has the advantage that working up of the reaction mixture is very considerably facilitated. The resulting methyl ethers are obtained in relatively pure state and can be purified by simple recrystallization. The use of aluminum alcoholates as methylation catalyst in the reaction of hydroxyl group-containing compounds of the yohimbane series thus permits large scale production of such ethers.

As stated above, not only reserpic acid methyl ester and other esters of said acid can be converted into their methyl ethers according to the present invention, but also other compounds having a yohimbane ring system, such as deserpidic acid esters, yohimbine, seredine, and the like. It is only necessary that the yohimbane compounds do not contain unprotected groups which may react with diazomethane and/or aluminum alcoholates in addition to the alcoholic hydroxyl groups to be etherified. Likewise, the solvent used in this reaction should not react with diazomethane and/or the aluminum alcoholate.

The following examples serve to illustrate the present invention without, however, limiting the same thereto.

EXAMPLE 1

2.1 g. of dried reserpic acid methyl ester and 0.6 g. of aluminum isopropylate are dissolved in 160 cc. of absolute dioxane. A solution of diazomethane in absolute ether is added thereto, whereby an excess of diazomethane over the calculated amount is used. The mixture is allowed to stand at room temperature in the dark for 18 hours. Thereafter, ethereal diazomethane solution is again added and the mixture is allowed to stand for 48 more hours. After distilling off the solvent, the residue is dissolved in 2 N acetic acid. The solution is rendered alkaline by the addition of ammonia and is extracted by means of methylene chloride. The methylene chloride extracts are combined and evaporated to dryness. The resulting residue is subjected to chromatographic purification by passing its benzene solution through a column of 40 g. of basic aluminum oxide. The O-methyl ether of reserpic acid methyl ester is obtained in the first fractions. After distilling off the benzene and recrystallizing the residue (about 1.6 g.) from isopropanol, the O-methyl ether of reserpic acid methyl ester is obtained in a yield of 1.2 g. Its melting point is 238° C. (with decomposition). Its optical rotation is $[\alpha]_D^{20} = -115.5° \pm 1°$ (concentration: 2% in methanol).

*Analysis.*—$C_{24}H_{32}N_2O_5$; molecular weight: 428.53. Calculated: 67.27% C; 7.53% H; 6.54% N. Found: 67.20% C; 7.41% H; 6.53% N.

EXAMPLE 2

0.25 g. of rescidic acid methyl ester of the melting point 237° C. (compare "Naturwissenschaften," vol. 48, 1961, page 73) are methylated in 30 cc. of absolute dioxane by means of diazomethane after addition of 0.3 g. of aluminum isobutylate by following the procedure described hereinabove in Example 1. On working up the reaction mixture, about 0.3 g. of the 18-O-methyl ether of reserpic acid methyl ester of the melting point 236–238° C. (with decomposition) are obtained.

EXAMPLE 3

1.13 g. of deserpidic acid methyl ester and 0.57 g. of aluminum isopropylate are dissolved in 60 cc. of absolute methylene chloride. A solution of diazomethane in methylene chloride is added thereto, whereby an excess of diazomethane over the required amount is used. After standing for twelve hours, 50 cc. of water and 0.5 g. of tartaric acid are added to the reaction mixture, which is then rendered alkaline by the addition of ammonia. The mixture is vigorously shaken and the aqueous layer is allowed to separate from the methylene chloride layer, which is separated, washed with water, and dried over anhydrous sodium sulfate. The light-colored residue (1.1 g.) remaining after distilling off the methylene chloride is either directly recrystallized from di-isopropyl ether or is first purified by chromatographic adsorption on aluminum oxide as described in Example 1 and then recrystallized. The colorless crystals of the 18-O-methyl ether of methylester of deserpidic acid melt at 203–204° C.; optical rotation: $[\alpha]_D^{21} = -127.4° \pm 1°$ (concentration: 2% in methanol).

Analysis.—$C_{23}H_{30}N_2O_4$; molecular weight: 398.5. Calculated: 69.32% C; 7.59% H; 7.03% N. Found: 69.26% C; 7.36% H; 7.31% N.

The process according to the present invention has proved to be especially suitable for the production of new and valuable methyl ethers of yohimbine and its isomer, α-yohimbine. These new ethers possess a central nervous system stimulating effect which is superior to that of yohimbine and α-yohimbine themselves. In addition thereto they exert a surprising effect on peripheral circulatory disturbances and thus can be used in the therapy of such disturbances.

The following examples illustrate the preparation of the methyl ethers of yohimbine and α-yohimbine without, however, being limited thereto.

EXAMPLE 4

*Yohimbine Methyl Ether*

10 g. of dry yohimbine base and 2.4 g. of aluminum isopropylate are dissolved in 250 cc. of absolute tetrahydrofuran. An ethereal diazomethane solution is added thereto, whereby an excess of diazomethane over the required amount is used. After allowing the mixture to stand for 12 hours, addition of ethereal diazomethane solution is repeated, and the reaction mixture is allowed to stand for 48 hours in the dark. The tetrahydrofuran is distilled off in a vacuum and the residue is dissolved in 2 N acetic acid. The resulting solution is rendered alkaline by the addition of concentrated ammonia and is repeatedly extracted with methylene chloride. The methylene chloride extracts are combined and dried over anhydrous sodium sulfate. The combined extracts are evaporated to dryness in a vacuum. The resulting residue of 10.8 g. is recrystallized from methanol. 8.1 g. of colorless crystals are obtained which melt, after drying, at 205–207° C. After repeated recrystallization from a mixture of methanol and methylene chloride (3:1) and drying at 100° C. in a high vacuum, the melting point increases to 212–213° C.; optical rotation: $[\alpha]_D^{22} = +66.0°$ (in ethanol).

Analysis.—$C_{22}H_{28}O_3N_2$; molecular weight 368.5. Calculated: 71.70% C; 7.66% H; 7.50% N. Found: 72.00% C; 7.43% H; 7.64% N.

The hydrochloride of said yohimbine methyl ether is obtained, for instance, by dissolving the ether in a small amount of isopropanol and adding ethereal hydrochloric acid. The precipitated hydrochloride melts at 296–298° C., on recrystallization from the above mentioned mixture of methanol and methylene chloride.

EXAMPLE 5

*α-Yohimbine Methyl Ether*

5 g. of carefully dried α-yohimbine base and 1.3 g. of aluminum isobutylate are dissolved in 130 cc. of absolute dioxane. An ethereal diazomethane solution is added thereto, whereby the diazomethane is used in excess over the required amount. After 24 hours addition of an ethereal diazomethane solution in excess to the required amount of diazomethane is repeated and the mixture is allowed to stand for 24 hours in the dark. The dioxane is distilled off in a vacuum and the residue is dissolved in 2 N acetic acid. The solution is rendered alkaline and is extracted with methylene chloride. The combined methylene chloride extracts are dried over anhydrous sodium sulfate. After distilling off the solvent, 5.44 g. of a slightly yellowish residue are obtained. On recrystallization from a mixture of methanol and methylene chloride (3:1), 4.26 g. of colorless crystals of the melting point 265–266° C. are obtained. On repeated recrystallization from the same solvent mixture, the melting point is increased to 266–267° C.; optical rotation:

$$[\alpha]_D^{22} = +36.5° \pm 0.3°$$

(concentration: 1.5% in pyridine).

Analysis.—$C_{22}H_{28}O_3N_2$; molecular weight: 368.5. Calculated: 71.70% C; 7.66% H; 7.60% N; $OCH_3$ 16.84%. Found: 71.54% C; 7.47% H; 7.52% N; $OCH_3$ 16.80%.

Acid addition salts of the resulting ether are obtained either by dissolving the ether in an inert anhydrous solvent and adding the required amount of the respective acid thereto or by neutralizing an aqueous suspension of the ether with the respective acid and evaporating the aqueous mixture to dryness. The bitartrate of the ether of the formula $C_{22}H_{28}O_3N_2 \cdot C_4H_6O_6$ melts at 248–250° C. (with decomposition), on recrystallization from the above mixture of methylene chloride and methanol.

In place of the esters used as starting materials in the preceding Examples 1 to 3, there may be employed other compounds of the yohimbine series which contain etherifiable alcoholic hydroxyl groups and in which other groups present therein and capable of reacting with diazomethane are either absent or protected against such action, such as corynanthine, seredine and β-yohimbine. As stated above, the methyl ethers obtained according to the invention have valuable physiological properties, rendering them suitable for therapeutic use. Thus, for instance, the methyl ether of reserpic acid methyl ester has a high sedative effect without exhibiting hypotensive activity. In general, the ether compounds of the yohimbine series show noteworthy advantages over the parent compounds. They have fewer undesirable side-effects, are faster acting, and have a shorter duration of activity.

In place of the aluminum alcoholates used in the preceding examples, there may be employed other aluminum alcoholates, preferably the alcoholates of lower alkanols, such as aluminum ethylate and methylate. In place of dioxane, ether, and methylene chloride used in the preceding examples, there may be employed other inert solvents which are neither affected by diazomethane nor by the aluminum alcoholates. Such other solvents are, for instance, tetrahydrofuran.

It is, of course, also possible to prepare other acid addition salts of the new ethers than those described hereinabove, for instance, acid addition salts with various pharmaceutically acceptable inorganic acids such as hydrobromic acid, nitric acid, sulfuric acid, phosphoric acid, and the like, or with pharmaceutically acceptable organic acids such as succinic aicd, citric acid, maleic acid, malic acid, malonic acid, benzoic acid, salicylic acid, phthalic acid, isonicotinic acid, and others.

Of course, many changes and variations in the starting materials, the catalysts, the amounts of catalysts added, the solvents used, the reaction conditions, temperatures, and duration, the methods of working up and recovering the resulting ether compounds and of purifying the same, and the like may be made by those skilled in the art in accordance with the principles set forth herein and in the claims annexed hereto.

Preferably, the reaction is carried out at room temperature, using as solvent a cyclic ether (such as dioxane, tetrahydrofuran) or a chlorinated hydrocarbon (such as methylene chloride). Instead of diazomethane, other diazoalkanes may also be used, such as diazoethane and diazo-n-butane, yielding the corresponding alkyl ethers of compounds of the yohimbane series.

We claim:

1. In a process of producing methyl ethers of compounds of the yohimbane series, the methoxy group being attached to at least one of the carbon atoms 17 and 18 of the yohimbane molecule, the steps comprising dissolving a yohimbane compound having free alcoholic hydroxyl groups attached to the carbon atoms 17 and 18 of the yohimbane molecule and an aluminum alcoholate, the carbon chain of which has three to four carbon atoms, in an inert solvent, adding thereto a solution of diazomethane in an inert solvent in excess to the required amount of diazomethane, allowing the mixture to stand at room temperature until methylation is completed, and recovering the resulting methyl ether of the yohimbane compound from the reaction mixture.

2. In the process of producing the methyl ether of reserpic acid methyl ester, the steps which comprise dissolving the methyl ester of reserpic acid and aluminum isopropylate in an inert solvent, adding thereto a solution of diazomethane in absolute ether in excess to the required amount of diazomethane, allowing the mixture to stand at room temperature until reaction is completed, and recovering the resulting methyl ether of reserpic acid methyl ester from the reaction mixture.

3. In the process of producing the 18-O-methyl ether of rescidic acid methyl ester, the steps which comprise dissolving rescidic acid methyl ester in an inert solvent, adding thereto aluminum isobutylate, admixing to the resulting solution a solution of diazomethane in absolute ether in excess to the required amount, allowing the mixture to stand until methylation is completed, and recovering the 18-O-methyl ether of rescipic acid methyl ester from the reaction mixture.

4. In a process of producing the 18-O-methyl ether of deserpidic acid methyl ester, the steps which comprise dissolving deserpidic acid methyl ester and aluminum isopropylate in an inert solvent, adding thereto a solution of diazomethane in an inert solvent in excess to the required amount of diazomethane, allowing the mixture to stand at room temperature until methylation is completed, and recovering the resulting 18-O-methyl ether of deserpidic acid methyl ester.

5. In a process of producing yohimbine methyl ether, the steps which comprise dissolving yohimbane base and aluminum isopropylate in an inert solvent, adding thereto a solution of diazomethane in an inert solvent in excess to the required amount of diazomethane, allowing the mixture to stand at room temperature until methylation is completed, and recovering the resulting yohimbine methyl ether.

6. In a process of producing α-yohimbine base and methyl ether, the steps which comprise dissolving α-yohimbine aluminum isobutylate in an inert solvent, adding thereto a solution of diazomethane in an inert solvent in excess to the required amount of diazomethane, allowing the mixture to stand at room temperature until methylation is completed, and recovering the resulting α-yohimbine methyl ether.

References Cited in the file of this patent

UNITED STATES PATENTS 2,809,199   MacPhillamy _____ Oct. 8, 1957

FOREIGN PATENTS 62,992/60   Australia _____ Feb. 2, 1961

OTHER REFERENCES

MacPhillamy et al., Jour. Amer. Chem. Soc., volume 77 (1955), pages 1071 and 1072.

Fieser et al., Organic Chemistry, Reinhold Pub. Co., New York, 3rd edition (1956), page 267.

Godtfredsen et al., Acta Chemica Scandinavica, volume 11 (1957), pages 1013–1016.

Research Today, volume XIV, No. 1 (1958), Lilly and Co., pages 15 and 16.

Manske, The Alkaloids, Academic Press, New York, volume VII (1960), pages 58, 59 and 62.